United States Patent [19]
Senba

[11] Patent Number: 4,839,484
[45] Date of Patent: Jun. 13, 1989

[54] GRUEL COOKER FOR MICROWAVE RANGES

[75] Inventor: Ayumi Senba, Tokyo, Japan

[73] Assignee: Hario Kabushiki Kaisha, Tokyo, Japan

[21] Appl. No.: 198,559

[22] Filed: May 25, 1988

[30] Foreign Application Priority Data

Nov. 18, 1987 [JP] Japan ................ 62-176208

[51] Int. Cl.⁴ .................................. H05B 6/80
[52] U.S. Cl. ................ 219/10.55 E; 219/10.55 R; 99/427; 99/451; 99/DIG. 14; 426/243
[58] Field of Search .......... 219/10.55 E, 10.55 F, 219/10.55 R; 99/410, 415, 416, 417, 426, 427, 448, 449, 451, DIG. 14; 426/241, 243

[56] References Cited
U.S. PATENT DOCUMENTS

| | | | |
|---|---|---|---|
| 4,039,797 | 8/1977 | Olsen | 219/10.55 E |
| 4,413,167 | 11/1983 | Martel et al. | 219/10.55 E |
| 4,477,705 | 10/1984 | Danley et al. | 219/10.55 E |
| 4,481,392 | 11/1984 | Nibbe et al. | 219/10.55 E |
| 4,532,397 | 7/1985 | McClelland | 219/10.55 E |
| 4,728,762 | 3/1988 | Roth et al. | 219/10.55 E |

*Primary Examiner*—Philip H. Leung
*Attorney, Agent, or Firm*—Fleit, Jacobson Cohn, Price Holman & Stern

[57] ABSTRACT

A rice gruel cooker suited for heating in a microwave range includes a bowl, a perforated rice container placed in the bowl and having a space for accommodating rice, and a lid held above the top end of the bowl. During heating, boiled water circulates actively through the space containing the rice and boils the rice uniformly without production of cores in rice particles despite quick heating in the microwave range. Specified lid position well prevents overflow and/or scattering of boiled water during cooking.

5 Claims, 3 Drawing Sheets

GRUEL COOKER FOR MICROWAVE RANGES

BACKGROUND OF THE INVENTION

The present invention relates to a gruel cooker for microwave ranges, and more particularly relates to a cooking device suited for preparation of rice gruel in microwave ranges.

In the conventional way of preparing rice gruel, rice and extra amount of water are mixed together and boiled in a pot rather slowly so that the rice should uniformly absorb the water during slow boiling. When this mixing ratio of water with rice is employed for cooking in a microwave range, quick boiling causes overflow of boiled water out of the pan. As a consequence, rice particles circulate in the water bath only and boiled rice particles include hard cores which mar relish of the obtained rice gruel. In addition, overflow of boiled water during preparation is quite unsuited for cooking in microwave ranges.

SUMMARY OF THE INVENTION

It is the basic object of the present invention to provide a gruel cooker for microwave range which enables preparation of savory rice gruel with no hard cores.

It is another object of the present invention to prevent overflow of boiled water during preparation of rice gruel in microwave ranges.

In accordance with the basic aspect of the present invention, a gruel cooker is made up of a microwave permeable bowl, a perforated microwave permeable rice container detachably encased in the bowl and a lid closing the open top end of the bowl.

DESCRIPTION OF THE PREFERRED EMBODIMENTS

Figure 1:
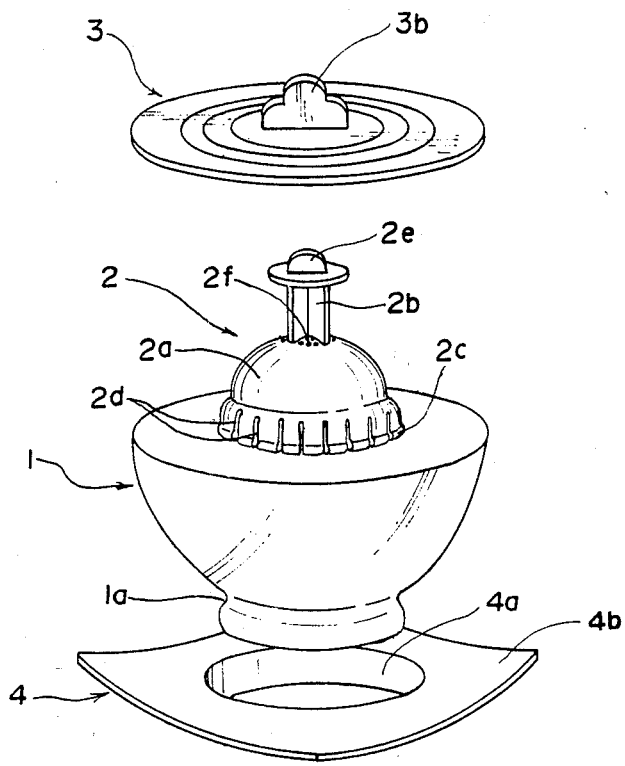
FIG. 1 is a perspective view of one embodiment of the gruel cooker in accordance with the present invention in a disassembled state.

As briefly stated above, the gruel cooker of the present invention is made up of a bowl 1, a rice container 2 and a lid 3.

The bowl 1 is made of a heatproof glass and provided with a bottom skirt 1a.

The rice container 2 is made of microwave permeable, heatproof synthetic resin such as polyester resin. The rice container 2 is made up of an inverted bowl section 2a open at the bottom end and a lid supporter 2b projecting upwards from the top end of the bowl section 2a.

Figure 2:
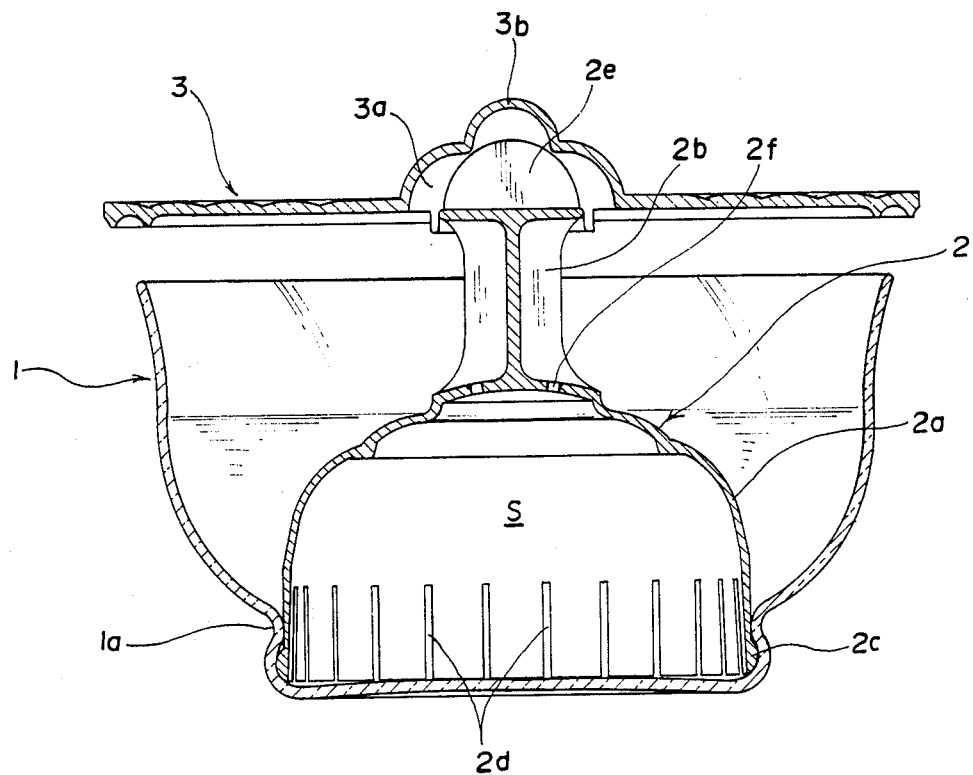
FIG. 2 is a side sectional view of the gruel cooker in the assembled state.

More specifically, the bowl section 2a defines a space S for accommodating rice in cooperation with the inside bottom of the bowl 1 when the latter is assembled with the rice container 2 as shown in FIG. 2. For stable assembly with the bowl 1, the rice container 2 is provided with a bottom brim 2c. A number of slits 2d are formed side by side in the bowl section 2a near the bottom of the rice container 2 in order to allow free passage of water. These slits 2d are sized so as not to allow free passage of rice contained in the space S. In addition, presence of these slits 2d provides the bottom portion of the rice container 2 with flexibility large enough to allow snap engagement of the portion with the bottom skirt 1a of the bowl 1. Further, a number of small openings 2f are formed side by side in the bowl section 2a near its top end. These openings 2f are also sized so as not to allow free passage of rice contained in the space S. The lid supporter 2b is sized so as to project above the upper edge of the bowl 1 when the rice container 2 is assembled with the bowl 1 and provided, at its top end, with an upstanding positioning piece 2e for engagement with the lid 3.

The lid 3 is made of microwave permeable heatproof synthetic resin such as polypropylene resin and somewhat larger than the top end opening of the bowl 1. The lid 3 is provided with a center recess 3a open downwards for receiving the positioning piece 2e on the rice container 2. A knob 3b is formed above the center recess 3a. The center recess 3a and the positioning piece 2e are sized and configurated so that a proper gap should be left between the lid 3 and the upper edge of the bowl 1 when the lid 3 is overlaid on the lid supporter 2b of the rice container 2 placed in the bowl 1. The size of the gap should be chosen so that no overflow of boiled water should occur during preparation of gruel in microwave ranges.

Preferably, the gruel cooker further includes a bottom tray 4 made of heatproof, and more preferably microwave permeable, synthetic resin such as polypropylene resin. The tray 4 has a center recess 4a receptive of the bottom skirt 1a of the bowl 1 and four corners 4b suited for manual handling of the gruel cooker.

Figure 3A:
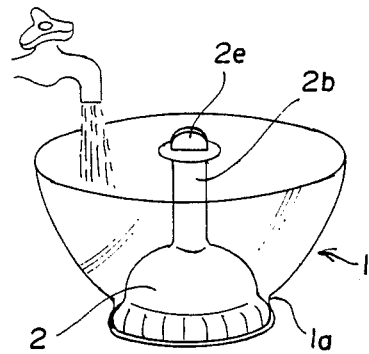
FIG. 3A to 3D are views for showing sequential steps in a process for preparing rice gruel using the gruel cooker of the present invention.

In preparation of rice gruel, the rice container is turned upside down to receive uncooked rice in its bowl section 2a as shown in FIG. 3A. Next, the open end of the rice container 2 is force inserted into the skirt 1a of the bowl 1 for the snap engagement. As a consequence, the rice is confined within the space S defined by the bowl section 2a of the rice container 2 and the inside bottom of the bowl 1. The capacity of the space S should preferably be five to six times larger than the usual volume of uncooked rice used for one time of preparation. In other words, the proper volume of uncooked rice used for one time of preparation is one-sixth to one-fifth of the capacity of the space. Water is next supplied into the bowl 1 while shaking the latter in order to cleanse the uncooked rice.

Figure 3B:
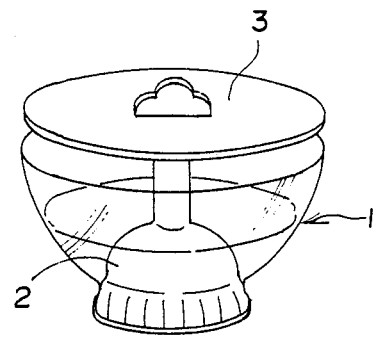
Figure 3C:
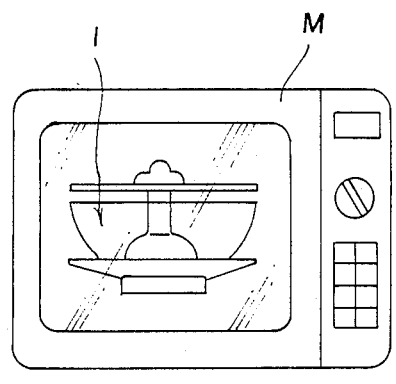
Figure 3D:
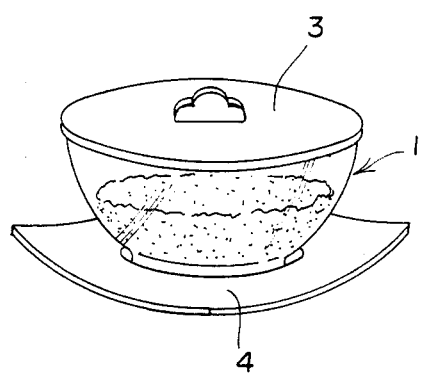

The old water is discharged and new water is supplied into the bowl 1 to a level just above the top end of the bowl section 2a of the rice container 2 as shown in FIG. 3B. The bowl 1 with the rice container 2 is placed in a position in a microwave range M as shown in FIG. 3C for boiling. During boiling water circulates into and out of the rice container 2 through the slits 2d and the openings 2f and, as a result of this boiled water circulation, the rice in the rice container 2 can be boiled quite uniformly without producing cores in particles. Since the lid 3 is kept at a position somewhat above the top end opening of the bowl 1, scattering and over flow of the boiled water are well prevented.

After complete boiling, the bowl 1 is taken out of the microwave range M preferably with assistance of the bottom tray 4 and the rice container 2 is disassembled from the bowl 1. Next, the boiled rice in the rice container 2 is mixed with boiled water in the bowl 1 and the top end opening of the bowl 1 is closed by the lid 3 now disassembled from the rice container 2 for steaming of the rice gruel in the bowl 1.

As a substitute of the uncooked rice, cooked rice can be used also for preparation of rice gruel with the gruel cooker in accordance with the present invention. The rice container 2 can be assembled with the bowl 1 in many known manners other than the snap engagement.

In accordance with the present invention, active boiled water circulation through a space containing rice causes uniform boiling of the rice without producing cores in particles, thereby greatly improving relish of prepared rice gruel. No scattering and overflow of boiled water is in particular suited for cooking in microwave ranges.

I claim:

1. A gruel cooker for microwave ranges comprising a microwave permeable bowl having a base, a circumferential skirt extending upwardly from the base, and a circumferential bowl wall extending upwardly from the skirt, the bowl wall defining an upper edge of the bowl, a microwave permeable rice container having an open end portion with a plurality of circumferentially juxtaposed slits, the end portion defining a rim of the container which is configured for snap engagement in the skirt of the bowl when the container is inverted thereby defining a cooking space between the container and the base of the bowl and a liquid space between the container and the bowl wall with said slits providing communication between the cooking space and the liquid space, the cooker further including a bowl lid and support means for detachably mounting the lid above the upper edge of the bowl.

2. A cooker as claimed in claim 1 wherein the container and the bowl are made of heat proof synthetic resin.

3. A cooker as defined in claim 1 wherein the support means comprises a lid support member extending from an outer surface of the container opposite said open end portion so as to project from the upper edge of the bowl when the rim of the container is engaged in the skirt of the bowl.

4. A cooker as defined in claim 3 wherein the lid support member has an upper end formed as a lid-positioning element, and the lid has a central formation adapted to fit on said element with a space defined between the lid and the upper edge of the bowl.

5. A cooker as defined in claim 1 further including a tray engageable externally with the skirt of the bowl.

* * * * *